Dec. 15, 1970 G. E. GATTNER ET AL 3,548,380
METHOD OF FORWARDING INFORMATION FROM A HIGH SPEED DATA PROCESSING SYSTEM TO A SLOWER OPERATING DATA PROCESSING SYSTEM
Filed March 16, 1965
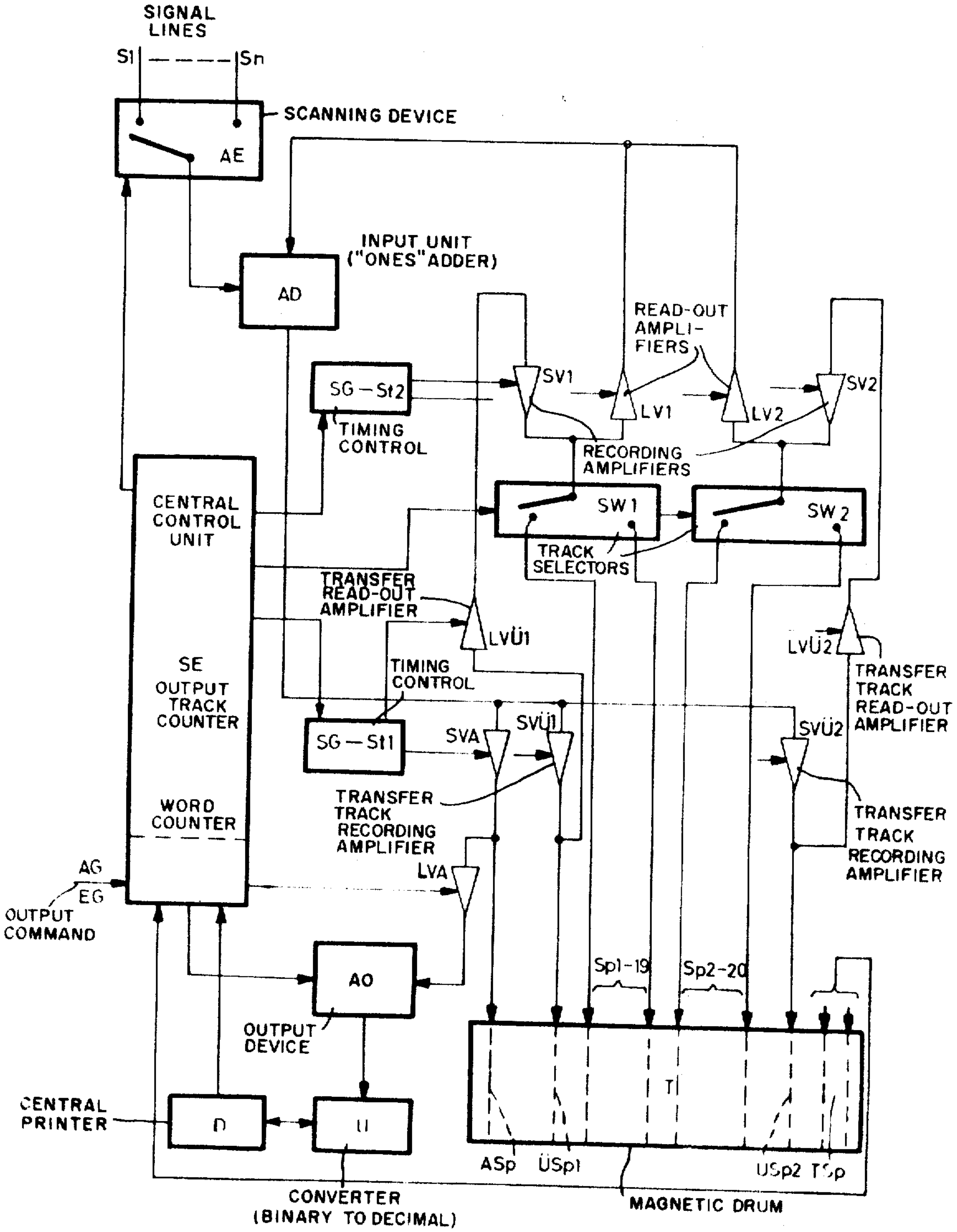

3,548,380
Patented Dec. 15, 1970

3,548,380

METHOD OF FORWARDING INFORMATION FROM A HIGH SPEED DATA PROCESSING SYSTEM TO A SLOWER OPERATING DATA PROCESSING SYSTEM

Günther E. Gattner and Karl-Heinz Widdel, Munich, Germany, assignors to Siemens Aktiengesellschaft, Munich, Germany Filed Mar. 16, 1965, Ser. No. 440,119
Int. Cl. G06f *3/00;* G11c *9/00*
U.S. Cl. 340—172.5 5 Claims

ABSTRACT OF THE DISCLOSURE

The disclosure of this application concerns storage of information such as telephone accounting information, in a high speed storage system, and readout of information therefrom by a relatively low speed system. In the method of the application compatability between the high speed storage system and the low speed readout system is achieved by transferring the information to be read out from the information tracks to an output buffer track, and reading out from that buffer track at the speed of the readout system.

The invention relates to storage devices of the type frequently required in telecommunications, accounting or computing systems, in which information is continually being inserted, and individual pieces of the stored information may be required to be extracted and fed to an output device. Storage devices of this type are for example used in telecommunications systems for charge assessment purposes, each subscriber being allotted a section of a memory and this section having stored in it the particular charge to be paid or a record of the number of metered units. With storage devices of this type, it is frequently necessary to feed out the stored pieces of information, individually or in succession, at a relatively slow rate without disturbing the normal cycle of operation of the device, as when feeding information to data-processing or printing equipment for compiling telephone bills, for example.

Where individual reading and writing devices are provided for each piece of stored information, the relay of all the pieces of information to a data-processing installation presents no difficulties since the individual memory sections of the storage device can be simultaneously employed as a buffer store to adapt the read-out to the slower cycle of operation of the installation, thus rendering it unnecessary to disturb the normal cycle of operation of the device. However, storage devices having individual read and write devices are much too unwieldy and often impracticable, as in the case where magnetic drums are used, for instance. Consequently, it is preferable to employ storage devices in which the writing device and one reading device handle several pieces of information. As a consequence the access time provided by the read-out process and the time required for relaying the individual pieces of information to a succeeding data-processing installation is much increased and in the extreme case can be equivalent to the duration of a complete operating cycle of the storage device. An access time of this order for individual pieces of information gives a time for the complete read-out of the information contained in the device which is frequently quite unacceptable, as read-out takes too long and the succeeding data-processing installation is not exploited to the full extent.

One object of the present invention is to provide a storage device that is capable of operating in a manner such as to enable a reduction in the average access time to be effected, this leading to better exploitation of the succeeding data-processing installation.

The present invention consists in a storage device including a plurality of information stores, input means for inserting information into said stores, a control unit providing means for extracting selected information from one or more of said stores, scanning means for reading out the information contained in any given store and inserting said information into a buffer store, and output means for delivering information from said buffer store to an output device when called for by said output device.

The invention may be embodied in the type of storage device in which the pieces of information are stored in cyclically operating manner, the individual stores being cyclically and successively scanned and the pieces of information being fed back at the original storage position through the medium of control circuit elements, in which case provision is made for the information to be relayed to more slowly operating data-processing systems such as punched tape transmitters upon receipt of a synchronous alteration command. The command signal obtains this result by virtue of the fact that the pieces of information read out in cyclic succession, after passing through the control circuit elements of an input unit which may or may not alter the information, are fed in dependence upon an out-storage command, group by group to a buffer store whence any required pieces of information are successively relayed to the succeeding data-processing installation as they are called up, until the buffer store is empty. Provision may be made, where information is to be extracted from several stores, so that each time the buffer store is emptied information from the next selected store in cyclic succession is transferred to the buffer store under the control of a monitoring device when that store is next scanned in the normal cycle of operation of the storage device. This process may be continued until all the pieces of information in the storage device have been transferred to the succeeding data-processing installation. When the individual groups of information have been fed to the buffer store, this information may be erased from the storage device in some cases. Due to the transferring of the pieces of information after passage through the aforementioned control circuit elements in the course of a normal cycle of operation of the storage device, any interference in this cycle of operation is avoided since it is immaterial as far as the functional scanning procedure during the cycle is concerned whether the pieces of information to be re-inserted in a store in fact return to their original storage positions immediately or are diverted to some other storage position in the buffer store. Since in every case, several pieces of information are received by the buffer store in a single cycle, and are thus continuously available for subsequent processing, the associated access times for these pieces of information are very short and this means that the succeeding data-processing installation can be exploited to the full. Only when pieces of information from another store have to be transferred to the buffer store is there any increase in the access times, and in fact the times may then occupy anything up to a complete storage cycle time. However, the number of these longer access times can be kept down by appropriately forming the groups, so that in relation to the total number of pieces of information they are negligible.

The invention is particularly simple to apply if the storage device is in the form of a magnetic drum carrying a plurality of parallel tracks and storage sections containing the individual pieces of information, as the pieces of information in each case held in such a track can form a group, and a further track on the drum can be used as a buffer store and provided with its own writing and reading means. The outlay required for the buffer store is in this case extremely small since in most cases there is a spare track available anyway.

The addresses of the individual pieces of information may be required for subsequent data-processing, for example these addresses may in fact be the subscribers' numbers in the case of charge information, but they can be derived quite simple from an address counter in accordance with the group or track code of the particular group of information transferred to the buffer store and with the word code of the individual pieces of information as determined by the storage phase, and these addresses may be relayed in company with the associated information to the data-processing installation.

The invention will now be described with reference to the accompanying drawing, which illustrates one embodiment, for the recording of signal pulses arriving in arbitrary sequence through several signal lines, in a central recording unit. The drawing schematically illustrates how such a unit is constructed.

The storage device in this embodiment consists of a magnetic drum T, provided in known fashion with a series of storage tracks S*p*1 to S*p*20. Each of these tracks is sub-divided, for example into 100 storage sections, and each storage section is itself divided into several storage cells. Each storage section holds a piece of information and individual storage cells contain the separate elements of this piece of information. The information will preferably be in binary code form, and in the example under consideration in each case indicates the number of signal pulses which have arrived through the particular signal line. In order to obviate difficulties associated with the reading and writing of the individual pieces of information, the storage tracks S*p*1 to S*p*20 are split into two groups in a known manner, one embracing the odd-numbered tracks 1 to 19 and the other the even-numbered tracks 2 to 20. Each group of tracks is allotted a so-called transfer track, US*p*1 and US*p*2 respectively. The cyclic selection of the individual tracks is effected by the group-allotted track selectors, SW1 and SW2 respectively, each of which is provided with an associated read-out amplifier, LV1 and LV2, and a recording amplifier SV1 and SV2. Similarly, each transfer track is provided with a recording amplifier SVU1 and SVU2 and a read-out amplifier LVU1 and LVU2. In order to make possible the cyclic circulation of information, the read-out amplifiers LV1 and LV2 of the two groups of tracks are linked with the recording amplifiers SVU1 and SVU2 of the two transfer tracks US*p*1 and US*p*2 by an alteration element or input unit, AD, which is in the form of a conventional "ones" adder in this embodiment. The read-out amplifiers LVU1 and LVU2 for the transfer tracks are connected in series with the recording amplifiers SV1 and SV2 of the associated groups of storage tracks.

The read-out and re-recording of the pieces of information contained in the tracks S*p*1 to S*p*20, is such that during a first revolution of the drum the pieces of information recorded in a track, e.g. S*p*1, are successively fed by the associated track selector SW1 and the associated read-out amplifier LV1 to the alteration unit AD and thence, first of all, via the recording amplifier SVU1 to the associated transfer track US*p*1, where they are immediately stored; thence, during the next revolution of the drum, they are fed by the read-out amplifier LVU1 and the recording amplifier SV1 back to their original storage positions. Simultaneously with the return of the pieces of information to storage track S*p*1, the pieces of information contained in the track e.g. S*p*2, next in cyclic succession are read out and fed to the associated transfer track US*p*2 for intermediate storage. During the next, third, revolution of the drum these pieces of information are returned to the track S*p*2 and at the same time the information is read out from the track of the first group next in cyclic succession, e.g. S*p*3. Thus, during each revolution of the drum, in one group of tracks out-storage of the information contained in the selected track is taking place whilst in the other group the return of the information out-stored during the preceding revolution is being effected. The track selectors SW1 and SW2 are thus advanced alternately, with each second revolution of the drum, and out-storage and return processes alternate with one another continually. Correct timing of the unblocking of the individual recording and read-out amplifiers for out-storage and return phases is monitored and controlled by control devices SG–S*t*1 and SB–S*t*2 allotted to the groups of tracks.

The presence of signal pulses in the individual signal lines S*l* to S*n* is monitored by the scanning device AE the output of which is connected to the control input of the alteration device AD. This scanning device AE operates in synchronism with the cycle of operation of the storage drum T, so that the results obtained by scanning the individual signal lines S*l* to S*n* are fed simultaneously with the associated information from the storage device T, to the alteration device AD.

All the devices in the circuit are controlled by the central control unit SE, which, in known manner, through the agency of synchronising pulses recorded on timing tracks TS*p* on the drum T, ensure that everything is synchronised with the rotation of the drum. This central control unit consists primarily of cyclically operating counters which count the drum revolutions, the storage sections in the individual tracks and the storage cells in the individual sections.

Furthermore, the drum T, in accordance with the invention, carries an additional track AS*p*, which provides an output buffer store, to which the individual pieces of information may be supplied by a recording amplifier SVA. This recording amplifier is connected in parallel with the recording amplifiers SVU1 and SVU2 associated with the separate transfer tracks US*p*1 and US*p*2 respectively, at the output of the alteration device AD, so that the pieces of information for out-storage can be taken from the track AS*p* without interferring in the cycle of operation of the storage device. An individual read-out amplifier LVA is also provided for the output track, via which the individual pieces of information are fed to an output unit AO which simultaneously receives the associated address from the central control unit. Address and information then pass through a converter U e.g. a binary-to-decimal converter, and on to the central printer D.

The out-storage of the individual pieces of information and their further relaying to the central printer D, are operations which are also controlled by the central control unit SE, this in dependence upon an output command AG/EG, and the state of operation of the printer itself.

Where out-storage is concerned, distinction has to be made between two different states of operation, namely on the one hand the out-storage of all the pieces of information stored on the drum T (an instance of this being the monthly collection of charge information in telephone systems, in order to prepare subscriber's bills) and on the other hand the out-storage of individual pieces of specific information (again, taking the instance of telephone charges, this could mean the preparation of a final account or a statement of account).

In the case where out-storage of all the information stored is required, the output command AG requesting this out-storage may be produced for example by depressing a key and is stored in the central control unit SE until all the information has been out-stored. Out-storage is initiated as soon as the next cycle of operation of the storage device commences, when the pieces of information contained in the storage track S*p*1 are out-stored and fed through the alteration circuit. Contrary to the normal cycle of operation, the individual pieces of information now no longer pass to the transfer track US*p*1 but are fed via the recording amplifier SVA to the output buffer track AS*p*. The transfer track US*p*1 in this case stays empty and the consequence of this is that during the following transfer phase erasure of the information still stored in the actual storage track $Sp1$ takes place. Transfer of the pieces of information contained in the storage track $Sp1$ to the output track $ASp$ terminates the first phase of out-storage, i.e. the recording amplifier SVA is then blocked again and the pieces of information in all the subsequent tracks are conducted alternately to the two transfer tracks and then fed back at their original storage positions. The transfer of the pieces of information intermediately stored in the separate storage tracks to the output buffer track $ASp$, is controlled by an additional output track counter in the central unit SE. Another word counter which is provided, serves to identify the individual pieces of information on the output track $ASp$ and makes possible the cyclic transfer of this information to the output device AO. Both counters are cyclically advanced, the word counter by the printer D each time a piece of information has been printed and the track counter by the word counter at the end of each cycle. Selection of the particular piece of information in each case transferred from the output track $ASp$ to the printer D, is effected by comparing the state of the output word counter with the word counter (in the central control unit SE) which monitors the operating cycle of the storage device. Each time this output word counter reaches its end position, i.e. when all the pieces of information intermediately stored in the output track have been out-stored, the track counter is advanced a step further and the transfer of the pieces of information contained in the cyclically next track, e.g. $Sp2$, to the output buffer track $ASp$, is initiated, until both counters are in their end positions. Simultaneously with the out-storage of the individual pieces of information, the counter states indicative of the out-stored pieces of information (counter states of the output track word counter and output word counter) are signalled to the output device AO and transferred to the printer together with the out-stored information.

In the case of the selected out-storing of individual pieces of information the out-storage of a specific piece of information is effected in a similar way by setting the output track word counter and output word counter to the value characteristic of the desired piece of information. By continuously comparing the count of the output track counter with the track counter which monitors the storage device, this latter counter being in the central control unit SE, it is first of all established when the storage track containing the desired piece of information will be ready for out-storage in normal operation of the drum. As soon as the information group containing the desired piece of information passes through the alteration device AD, this group is conveyed to the output buffer track $ASp$. This does not prevent transfer of the information to the transfer tracks $USp1$ or $USp2$ as the case may be. The output word counter, as in the case of the complete out-storage of all the information, then selects the desired piece of information. Depending upon which of these states of operation is involved, the out-stored information which is available in the corresponding transfer track $USp$ for return to its original storage position, can be allowed to remain in storage or can be erased. The latter is effected quite simply by blocking the recording amplifier through which the output-stored piece of information would normally be returned.

What is claimed is:

1. A method of forwarding information from a high speed cyclically operating register system to a slower operating data processing system through a buffer store under control of a control unit comprising:
scanning the register system successively in cyclic fashion, and synchronously comparing its recorded information with new information entering the register system,
altering the scanned information to update it to reflect the new information, and then, re-registering the scanned information, as altered, if altering is necessary, in its old register locations or transferring requested information from the register system to a slower operating data processing system, the transferring operation including,
forwarding the requested information as it is scanned to a buffer store in response to a forwarding order from the control unit,
successively interrupting the forwarding of the requested information to the buffer store when that store is full and resuming the forwarding step when that store is empty,
forwarding additional requested information to the buffer store during the next cycle of operation until all of the requested information has been forwarded to the buffer store,
transferring the requested information successively from the buffer store to the data processing system upon demand by the control unit and at the speed of the data processing system.

2. The method of claim 1 in which the register system includes a magnetic drum with a plurality of information tracks and at least one transfer track, the cyclic scanning including successive transfer of the information stored in the plurality of information tracks to the transfer track while such comparison with new information takes place, and transfer back from the transfer track to the information track on which the information was originally stored, the step of forwarding the requested information to the buffer store occurring when that information is being scanned for transfer to the transfer track, and being carried out by recording the information on a further track of the magnetic drum.

3. The method recited in claim 2 further comprising:
inhibiting transfer of information to the transfer track in response to the forwarding order.

4. The method recited in claim 2 further comprising:
storing information in two groups of information tracks on the magnetic drum, each group consisting of a plurality of tracks, there being a transfer track for each group of information tracks;
the normal scaning step proceeding in a cycle such that information is always transferred to its transfer track from one of its group of information tracks while information is transferred from the other transfer tracks to one of its group of information tracks.

5. The method recited in claim 4 further comprising:
inhibiting the recording of information in the transfer track when the requested information is being scanned from the information track corresponding to that transfer track, in response to the forwarding order, and
in the next scanning cycle, inhibiting the recording of information in the information track when the portion of the transfer track on which no information was recorded is being scanned.

References Cited

UNITED STATES PATENTS

| | | | |
|---|---|---|---|
| 3,122,726 | 2/1964 | King, Jr., et al. | 340—172.5 |
| 3,032,746 | 5/1962 | Kautz | 340—172.5 |
| 3,014,654 | 12/1961 | Wilser et al. | 340—172.5 |
| 2,988,735 | 6/1961 | Everett et al. | 340—172.5 |
| 2,905,930 | 9/1959 | Golden | 340—172.5 |
| 3,312,950 | 4/1967 | Hillman et al. | 340—172.5 |
| 3,312,945 | 4/1967 | Berezin et al. | 340—172.5 |
| 3,311,891 | 3/1967 | Brady et al. | 340—172.5 |
| 3,278,906 | 10/1966 | Gountanis et al. | 340—172.5 |
| 3,257,645 | 6/1966 | Lekven | 340—172.5 |
| 3,029,412 | 4/1962 | Southard | 340—172.5 |
| 2,905,930 | 9/1959 | Golden | 340—172.5 |
| 2,988,735 | 6/1961 | Everett et al. | 340—172.5 |

GARETH D. SHAW, Primary Examiner